(12) United States Patent  (10) Patent No.: US 8,239,425 B1
Bell et al.  (45) Date of Patent: Aug. 7, 2012

(54) ISOLATING DESIRED CONTENT, METADATA, OR BOTH FROM SOCIAL MEDIA

(75) Inventors: Eric B. Bell, Richland, WA (US); Shawn J. Bohn, Richland, WA (US); Andrew J. Cowell, Kennewick, WA (US); Michelle L. Gregory, Richland, WA (US); Eric J. Marshall, Corvallis, OR (US); Deborah A. Payne, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 13/036,776

(22) Filed: Feb. 28, 2011

(51) Int. Cl.
*G06F 7/00* (2006.01)
(52) U.S. Cl. .......................... 707/807; 706/12
(58) Field of Classification Search .................. 707/802, 707/803, 807, 999.1; 706/12, 55
See application file for complete search history.

(56) References Cited

U.S. PATENT DOCUMENTS

| | | | |
|---|---|---|---|
| 6,687,404 B1 * | 2/2004 | Hull et al. | 382/226 |
| 7,974,934 B2 * | 7/2011 | Ravikumar et al. | 706/12 |
| 2009/0248608 A1 * | 10/2009 | Ravikumar et al. | 706/55 |

OTHER PUBLICATIONS

Hammer, J., et al., "Extracting Semistructured Information from the Web," Proceedings of the Australasian Data Mining Conference, 1997, 18-25 pp., ACM Press, Tucson, Arizona, USA.
How, L.C., et al., "Stylistic and Lexical Co-training for Web Block Classification," Proceedings of International Workshop on Web Information and Data Management (WIDM '04), ACM Press, Washington, DC.
Hiremath, P.S., et al., "Mining Data Regions from Web Pages," Proceedings of International Conference on Management of Data, Computer Society of India, Goa, India.
Wang, J., et al., "Data-rich Section Extraction from HTML pages," Proceedings of the 3rd International Conference on Web Information Systems Engineering (WISE '02), 2002, 1-10 pps., IEEE Press, Atlanta, Georgia.
How, L. C., "PARCELS: PARser for Content Extraction of Logical Structure (Stylistic Detection)," Honours Year Project Report, 2003/2004, Department of Computer Science, School of Computing, National University of Singapore.
Algur, S.P., et al., "Extraction of Flat and Nested Data Records from Web Pages," Proceedings of the Australasian Data Mining Conference, 2006, 163-168 pps., Australian Computer Society, Inc., Sydney, Australia.
Kohlschutter, C., "Boilerplate Detection Using Shallow Text Features," Proceedings of International Conference on Web Search and Data Mining, WSDM '10, Feb. 4-6, 2010, ACM Press, New York City, New York, USA.

* cited by examiner

Primary Examiner — Hung T Vy
(74) Attorney, Agent, or Firm — Allan C. Tuan

(57) ABSTRACT

Desired content, metadata, or both can be isolated from the full content of social media websites having content-rich pages. Achieving this can include obtaining from the content-rich pages a language-independent representation having a hierarchical structure of nodes and then generating a node representation for each node. Feature vectors for the nodes are generated and a label is assigned to each node representation according to a schema. Assignment can occur by executing a trained classification algorithm on the feature vectors. The schema has schema elements and each schema element corresponds to a label. For each schema element, all node representations having matching labels are gathered and then one node representation is elected from among those with matching labels to be assigned to a schema element field in a template. The template can be applied to extract desired content, metadata, or both according to the schema from all the content-rich pages.

19 Claims, 5 Drawing Sheets

1. Structural Features
    - Total child nodes
    - Block width
    - Block height
    - X location on page
    - Y location on page
    - Begin, end region for x, y coordinates
    - Area as a percentage of the total area of the page
    - Aspect ratio (block width / block height)
    - Width ratio (block width / page width)
    - Height ratio (block height / page height)
2. Stylistic Features
    - Line height
    - Font size
    - Font weight
    - Font contrast
    - Total links
    - Total linked words
3. Text Features
    - Linked word ratio (total linked words / total words)
    - Total consecutive relevant words
    - Relevant word ratio (total consecutive relevant words / total words)

Fig. 3

|  | Precision | Recall | F-Measure |
|---|---|---|---|
| Baseline System | 0.683 | 0.683 | 0.683 |

Fig. 4

|  | Precision-Content | Recall-Content | F-Measure-Content |
|---|---|---|---|
| NB Updateable | 0.158 | 0.966 | 0.271 |
| Bayes Net | 0.302 | 0.932 | 0.456 |
| Ada Boost M1 | 0 | 0 | 0 |
| BF Tree | 0.816 | 0.678 | 0.741 |
| Decision Tree | 0.943 | 0.847 | 0.893 |
|  | Precision-Title | Recall-Title | F-Measure-Title |
| NB Updateable | 0.773 | 0.983 | 0.866 |
| Bayes Net | 0.634 | 1 | 0.776 |
| Ada Boost M1 | 0.333 | 0.102 | 0.156 |
| BF Tree | 0.946 | 0.898 | 0.927 |
| Decision Tree | 1 | 0.983 | 0.991 |
|  | Precision-Date | Recall-Date | F-Measure-Date |
| NB Updateable | 0.168 | 0.983 | 0.924 |
| Bayes Net | 0.983 | 1 | 0.992 |
| Ada Boost M1 | 0 | 0 | 0 |
| BF Tree | 1 | 1 | 1 |
| Decision Tree | 1 | 1 | 1 |

Fig. 5

|  | Precision | Recall | F-Measure |
|---|---|---|---|
| NB Updateable | 0.979 | 0.888 | 0.924 |
| Bayes Net | 0.988 | 0.969 | 0.976 |
| Ada Boost M1 | 0.941 | 0.967 | 0.953 |
| BF Tree | 0.993 | 0.993 | 0.993 |
| Decision Tree | 0.998 | 0.998 | 0.998 |

*Fig. 6*

|  | F-Measure |
|---|---|
| NB Updateable | 0.687 |
| Bayes Net | 0.741333 |
| Ada Boost M1 | 0.052 |
| BF Tree | 0.889333 |
| Decision Tree | 0.961333 |

*Fig. 7*

| ID | Domain | Posts | Content | Title | Date |
|----|--------|-------|---------|-------|------|
| 1 | Business | Pass | Pass | Pass | Pass |
| 2 | Technology | Pass | Pass | Pass | Pass |
| 3 | Technology | Pass | Pass | Pass | Pass |
| 4 | Politics | Fail | Fail | Fail | Fail |
| 5 | Politics | Fail | Fail | Fail | Fail |
| 6 | Politics | Pass | Pass | Pass | Pass |
| 7 | News | Pass | Pass | Pass | Pass |
| 8 | Science | Pass | Pass | Pass | Pass |
| 9 | Science | Pass | Pass | Pass | Pass |
| 10 | Sports | Pass | Pass | Pass | Pass |

Fig. 8

ISOLATING DESIRED CONTENT, METADATA, OR BOTH FROM SOCIAL MEDIA

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Social media, which can include interne forums, weblogs (blogs), wikis, comment threads, social network services, etc., can be utilized, at least, as measures of public opinion, attitude, and social structures. Reaction to news or events in this medium is often nearly instantaneous, providing opportunity to make quick measurements of short-term impacts of specific stimuli. However, a major challenge in leveraging this information is automatically extracting desired content and/or metadata from web pages, since there is no standard, universally supported, machine-readable format for presenting the social media. Therefore, a need for methods and systems for isolating desired content, metadata, or both from social media exists.

SUMMARY

The present invention relates to techniques for transforming data from one or more social media websites into a common schema that isolates desired textual content and metadata from the full content of the social media websites. An exemplary system for implementing the techniques can comprise processing circuitry executing the appropriate process steps, which can be stored on at least one form of storage media. In one embodiment, the process steps can comprise providing a live website, a static harvest of a website, or both through communications circuitry, storage media, or both. The website can comprise one or more content-rich pages including, but not limited to, blog posts, forum threads, and comment threads. Each of the content-rich pages are parsed to obtain a language-independent representation comprising a hierarchical structure of one or more nodes. One particular example of a language-independent representation is a document object model (DOM) structure.

For each of the nodes in the language-independent representation, a node representation is generated. Node representations, as used herein, comprise computer-readable expressions that are stored in memory circuitry and that represent, or point to, actual nodes in the language-independent representation. An exemplary node representation is an XPath expression. Memory circuitry can include, but is not limited to, magnetic disks, memory chips, solid state drives, flash memory, and other volatile or non-volatile data storage media.

A feature vector is generated for each node of the language-independent representation and is used for assignment of a label to each of the node representations. Feature vectors, as used herein, can refer to n-dimensional vectors of quantified features that describe a node. Examples of features characterized by feature vectors can include, but are not limited to, percentage of total area encompassed by a node, total child nodes, linked word ratio, and relevant word ratio. In one embodiment, language type is devalued as a feature relative to other features, thereby maintaining consistency with preferred embodiments, which are operated independent of the language type of the website.

The labels are assigned to node representations according to a schema by executing a trained classification algorithm on the feature vectors of the content-rich pages. The schema comprises one or more schema elements and each schema element corresponds to a label. The schema defines the abstracted structure of a website, with elements corresponding to the generalization of common parts of webpages across multiple websites.

In one embodiment, the trained classification algorithm is generated according to statistics provided by a training set. Examples of such classification algorithms include, but are not limited to, Naïve Bayes, Maximum Entropy, Support Vector Machine, and K-nearest neighbors. Alternatively, the trained classification algorithm is generated from a set of rules provided at least in part, by input from a user. Such a user can provide the rules using an input device. Furthermore, the trained classification algorithm can be modified based, at least in part, on the desired content, metadata, or both extracted from the content-rich pages. Accordingly, subsequent classifications and label assignments can be improved by previous classifications and assignments.

For each schema element, all the node representations having matching labels are gathered. From among the gathered node representations with matching labels, one node representation is elected to assign to a schema element field in a template. The template having one or more populated schema element fields can then be applied to extract desired content, metadata, or both according to the schema from all of the content-rich pages.

Preferably, elections comprise conducting numerical voting or weighted voting. In one example of numerical voting, the number of votes is equivalent to the number of content-rich pages. In contrast, weighted voting can involve applying a weighting factor to one or more votes, thereby conferring increased or decreased significance to certain votes.

In one embodiment, the desired content, the metadata, or both extracted from all of the content-rich pages can be output to communications circuitry and/or to a display device.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

FIG. 3 is a list of exemplary features that can be characterized in feature vectors according to some embodiments of the present invention.

FIG. 4 is a table summarizing baseline data for comparison with embodiments of the present invention.

FIG. 5 is a table summarizing performance results from embodiments of the present invention.

FIG. 6 is a table summarizing performance results for various classification algorithms used by some embodiments of the present invention.

FIG. 7 is a table summarizing performance results for various classification algorithms used by some embodiments of the present invention.

FIG. 8 is a table demonstrating the performance of a rules-based embodiment of the present invention.

DETAILED DESCRIPTION

Figures 1, 2:
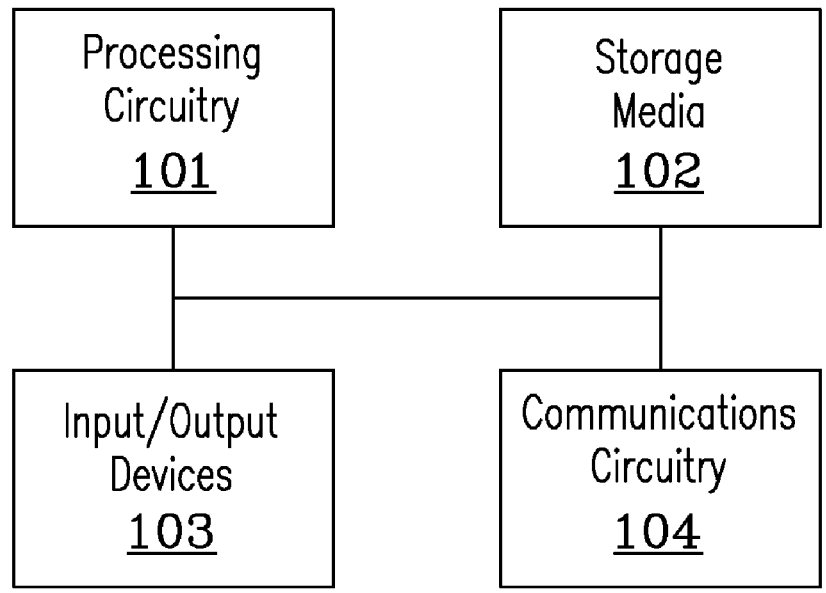
FIG. 1 is a block diagram depicting a system for isolating desired content and/or metadata according to embodiments of the present invention.
FIG. 2 is a diagram depicting exemplary regions of a web page according to embodiments of the present invention.

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

FIGS. 1-8 show a variety of embodiments of the present invention. Referring first to FIG. 1, a block diagram depicts one embodiment of a system for isolating desired content, metadata, or both from social media. The processing circuitry 101, storage media 102, communications circuitry 104, and input/output devices 103 are operably connected such that the processing circuitry can operate according to data and instructions provided by the storage media, the communications circuitry, or both. In a particular embodiment, the instructions are implemented in the Java language. User input can be received through the input devices. Results and/or intermediate output can optionally be presented on output devices. Alternatively, the output can be delivered to another system through the communications circuitry.

The storage media and/or the communications circuitry can provide instructions executable by the processing circuitry to parse content-rich pages to obtain a language-independent representation comprising a hierarchical structure of one or more nodes. The storage media and/or the communications circuitry can also provide the content-rich pages, which are parts of a live website, of a static harvest of a website, or of both.

The processing circuitry can also execute instructions to generate a node representation for each node and to generate a feature vector for each node. Exemplary features characterized in the feature vector can include, but are not limited to, structural, stylistic, and text features. Examples of structural features can include, but are not limited to total child nodes, block width, block height, X location on a page, Y location on a page, begin/end region for x, y coordinates, area as a percentage of the total area of a page, aspect ratio (e.g., block width/block height), width ratio (block width/page width), height ratio (e.g., block height/page height). As used herein, a block can refer to any structural HTML element of a web page. Examples of stylistic features can include, but are not limited to line height, font size, font weight, font contrast, total links, and total linked words. Examples of text features can include linked word ratios (e.g., total linked words/total words), total consecutive relevant words, and relevant word ratios (total consecutive relevant words/total words). The node representations and the feature vectors can comprise an expression stored in the storage media.

The processing circuitry further assigns a label to each node representation according to a schema by executing a trained classification algorithm on the feature vectors of the content-rich pages. The schema can be stored on the storage media and/or be provided through the communications circuitry and can comprise one or more schema elements. Each of the schema elements corresponds to a label. For each schema element, all the node representations having matching labels are gathered and one node representation from among all those with matching labels is elected to be assigned to a schema element field in a template. The template is then applied to all of the content-rich pages to extract the desired content, metadata, or both. The desired content and/or metadata can then be provided for output and/or transmitted through the communications circuitry.

Example

Isolation of Desired Content and Metadata from Weblogs

Blogs are often used by individuals and organizations to share their thoughts, feelings, or news with friends, family, or the rest of the world. A blog is made up of one or more blog posts (typically referred to simply as 'posts'), where each post typically consists of at least the following attributes:

Title
Content
Author
Comments

Many sites provide additional information that could be useful for extraction, but in this example, only those attributes that are common to all or most blog sites are emphasized. The title of a blog post is typically a headline-style string meant to summarize or attract attention to the content of the post. The content of a blog post contains the bulk of the text, including the message that the author wishes to deliver. The date is some indication of when the post was published. This typically refers to either the date and time that the post was first published, or the date and time that the post was most-recently edited. The date typically ranges from hour, minute, and second precision, to just the year, month, and day. The author field indicates who submitted the post, and can be anything from a username, nickname, full name, or even a full name with title (e.g., "Dr.").

Many blogs also provide the ability for visitors to the site to comment on the posts. These comments may consist of the same attributes that make up a post: comment title, comment content, comment date, and comment author. In addition, some sites allow comments to be threaded by attaching a comment directly to another comment, instead of to the post itself.

Comment attributes are different than the blog attributes in that they may appear zero or many times on a given page, with multiple values per blog post, while blog attributes generally appear exactly once and have a single value per blog post.

This presents a challenge when manually creating extraction rules, as craft the extraction rules need to be carefully crafted values are not missed by overly constraining the rules. Comment attributes also require a different approach for automated extraction since many elements may need to be assigned the same label instead of the one-to-one relationship between elements and blog attributes.

The physical web pages of a blog site can typically be divided into one of three categories:
post pages
index pages
meta pages A post page is a single page containing the common attributes of a post, defined above. An index page consists of a sequence of links to post pages. These links are typically accompanied by a summary of the post. Meta pages are pages about the site, and everything else that does not fall into one of the first two categories. Given the post pages from a blog site, embodiments of the present example described in the instant example can extract the title, content, and date attributes for each post page provided.

The prior art includes some work that has been done to create standard syndication formats, such as RSS and Atom, which can be used to publish new information in a common, machine-readable format. When implemented properly, these formats can be used to extract information from social media. However, experience has shown that in order to monetize their content, many blog authors restrict their feeds by truncating the content, mixing advertisements in with the feed's content, and other tactics in order to force users to visit their site, and to maximize page views. While many of the large blog software packages automatically provide RSS and Atom syndication, many of the smaller sites have not added these features. In light of the possible absence of or incompleteness of RSS and Atom, they cannot be relied upon to provide the desired content and/or metadata.

Prior to information extraction from web pages, boilerplate content (e.g., headers, footers, navigational elements, and ads) can be eliminated from the relevant content unique to each page. Accordingly, in some embodiments, boilerplate content is eliminated prior to isolation and extraction of desired content and/or metadata. Such elimination can be accomplished, for example, using one of a variety of publicly available implementations of boilerplate removal algorithms. A particular example includes the open source software, Boilerpipe (Kohlschutter, Fankhauser, and Nejdl 2010), which performs well on selected index and post pages from the dataset of the instant example. The Boilerpipe algorithm uses a combination of structural features, shallow text features, and densitometric features to classify the text from a web page as either relevant or not relevant. This relevance classification can also be used when computing the features for each web block by comparing the text contained within a given web block to this relevance classification.

A block is a designation given to a subset of DOM elements, the set of which we refer to as structural HTML elements. Exemplary structural HTML elements are listed in Table 1.

Rather than visiting the blocks in a DOM in a bottom-up manner, the blocks of a page are preferably processed using a top-down approach to allow for identification of the most general element containing the metadata of interest. Bottom-up approaches can be prone to a sub-optimal division of elements, as some relevant blocks may be left out and not classified with a neighboring element under certain conditions.

TABLE 1

| Structural HTML Elements | |
|---|---|
| <body> | <div> |
| <table> | <span> |
| <tr> | <h[1-6]> |
| <td> | <p> |

By viewing a weblog page as a collection of elements rather than an explicitly formatted container for information, the embodiment of the present example easily handles changes to the format of a site. Additionally, the predictive nature of the classification and heuristic-based approaches described herein, once applied, can provide the ability to handle previously unseen blogs, including those with notably different formats from those already encountered.

Once a page has been divided into a series of blocks, then feature vectors can be generated for each block. A significant variety of features can be computed according to embodiments of the present invention. For example, features can include, but are not limited to, structural and stylistic features, relevancy features representing the structural features, shallow text features, densitometric features, as well as features based on the relative size of each block for identifying the most relevant section of a page.

In order to quantify a block's location on a page in a more general manner than simply listing the x and y coordinates, which can also be computed, it was preferable to break a page into a 3×3 grid of cells as shown in FIG. 2. Furthermore, the contrast of a block was calculated using the Cascading Style Sheets (CSS) properties for font-color and background-color to calculate the difference in luminance for the background and foreground. Given the linear RGB components of an element's color, R, G, and B, the relative luminance equation shown below can be used for calculating the luminance of each color.

$$Y = 0.30R + 0.59G + 0.11B$$

These calculations were applied to compute a set of features for each block, based on the surrounding structure of the web page. The list is shown in FIG. 3.

Two kinds of instructions, which were executable by the processing circuitry, were coded in the Java programming language. A statistics-based approach, when executed, processed each post page and created feature vectors for each block on the page. It involved reading a set of HTML pages, constructing DOMs for each page, and extracting structural and stylistic attributes from each node in a DOM, reasoning over all of this information and providing an output. A rules-based approach, when executed, mirrored a weblog and then processed that directory to locate post pages. DOM nodes were subsequently located, which became candidates for each of the desired elements of a template.

An unexpected challenge arose regarding how to extract the stylistic information from the web pages. The key problem is that, although there are a number of libraries available for parsing XML and preparing HTML for being parsed in this way, the task of parsing CSS files is much less common, and the tools for working with CSS programmatically are much more difficult to work with.

To address the challenge, the public Mozilla API was used to interact with the browser's DOM and extract CSS attributes directly from the DOM nodes, thereby eliminating the problem of inequivalent DOMs, and providing an ability to leverage the CSS engine built into the Gecko layout engine, maximizing interoperability with popular web browsers.

The rules-based approach for generating templates involved identifying post pages from the index page of a site. In one embodiment, this was accomplished through identifying the largest block on the page, dividing that block into post blocks and then comparing the content of the post block candidates to other pages in the directory structure that are local to the blog's domain.

Identification of the blog elements (e.g., Content, Title, and Date) occurred by pulling title candidates from the post pages and comparing them to the content from the post blocks on the index page. Across multiple pages possible XPath candidates are produced in a weighted voting scheme. These candidates are used to select the optimal XPath that will extract a post's title across the website. Locating the content occurs in a similar manner as locating the title, but the content candidates, instead of the title candidates, are pulled from the post pages.

Date extraction occurs differently. Date extraction in the present example, begins with searching all n post pages for any regular expression matches to known date formats. The search begins at the DOM nodes containing the content and title and then branches. Weighted voting allows for a pattern of dates occurring at a specific element in the same format across post pages to become the XPath for the date element, along with the normal formats for Date elements on that site.

Results from the statistics-based and rules-based approaches were compared. As a baseline for comparison, a set of 60 different posts across three different blog sites were obtained. Two of the blog sites had a fixed format, while the third site's posts varied in format. A template was hand-created for extraction on each site based on the content of a single post page from each. This hand-created template was compared with the gold standard annotation for each of the 60 post pages. The results are shown in FIG. 4.

The scores presented reflect baseline performance on a set of blogs where for two thirds of the testing set, the posts fit one of two templates. Therefore, these scores may be over-inflated in comparison to other datasets, but they do reflect a random sampling from blog sites. The baseline system performs well in cases where the entire site is of a single format. However, with a site where posts vary in format and across different sites, the baseline system is ineffective. When isolating content and metadata on a web-scale, creation of a template for every weblog encountered is ineffective and non-instantaneous.

In order to test the statistics-based approach of classifying DOM elements, three blogs were selected. For each blog, twenty blog posts were hand-coded for a total of 60 labeled examples. For each example, the XPath for the node containing the title, content, and date attributes were identified. Using these labels, a dataset was generated by creating a feature vector for each node in each of the 60 blog posts. Each post contained 371 structural nodes on average, three of which were labeled as one of "title", "content", or "post", and 368 of which received a generic label of "other." In all, 22,285 feature vectors were generated, 60 of which were labeled with each of the three attributes that had been labeled, and 22,105 received the generic label.

The Weka Machine Learning software package (Hall et al. 2009) was chosen for the classification system. The dataset was run against the following five algorithms provided by Weka:
1. Naïve Bayes Updateable
2. Bayes Net
3. Ada Boost MI
4. Best-First Decision Tree
5. Decision Table Each algorithm was tested using 10-fold cross validation. FIG. 5 shows the scores of each classification algorithm by class label. The overall precision, recall, and F-measure scores are presented for each algorithm in FIG. 6. Each algorithm performed quite well using these metrics; however, it appears the scores may be slightly misleading, as the vast majority of examples labeled "other" inflate the true positive counts, leading to these high scores. This is most evident by the scores of Naïve Bayes Updateable, which was the only algorithm that had relatively low accuracy for "Other" examples, as shown in FIG. 5.

In order to eliminate the effect of inflated scores present in FIG. 6, the scores presented in FIG. 7 were computed by averaging the F-measures for the other three class labels, ignoring the scores for the examples labeled "other." This provides an alternative overview of how well each algorithm predicted the attributes of interest.

While automated classification tends to perform well on unseen sites, the requirement for training data makes it impractical for fully automated systems. To test the rules-based approach, a set of ten different blogs from different domains were selected. The rules-based algorithm was then run against a mirror of the site, and the resultant XPaths were compared to gold-standard XPaths created by humans. The results of this analysis are presented in FIG. 8. Pass/fail is a binary description of whether the resultant XPath from the heuristic system was an exact match with the XPath in the gold-standard.

Of the ten blogs tested, the template was correctly matched for all four elements: Post, Content, Title, and Date on eight out of the ten blogs. For the remaining two blogs, the algorithm failed to identify correctly the XPath for post pages, and therefore was unable to select correct XPaths for the subsequent elements. This is a disadvantage of the heuristic-based approach; failure at any point in the process results in continuing failure at subsequent parts of the process While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A computer-implemented method for isolating desired content, metadata, or both from social media, the method characterized by the steps of:

providing a live website, a static harvest of a website, or both, through communications circuitry, storage media, or both, the website comprising one or more content-rich pages;

parsing each of the content-rich pages to obtain a language-independent representation comprising a hierarchical structure of one or more nodes;

generating a node representation for each of the nodes, the node representation comprising a computer-readable expression stored in memory circuitry;

generating a feature vector for each node of the language-independent representation;

assigning a label to each node representation according to a schema by executing a trained classification algorithm on the feature vectors of the content-rich pages using processing circuitry, the schema comprising one or more schema elements, each schema element corresponding to a label;

gathering, for each schema element, all node representations having matching labels;

electing from among the node representations having matching labels one node representation to assign to a schema element field in a template; and applying the template to extract the desired content, metadata, or both according to the schema from all of the content-rich pages.

2. The method of claim 1, wherein the node representation comprises an XPath expression.

3. The method of claim 1, further comprising generating the trained classification algorithm according to statistics provided by a training set from communications circuitry, storage media, or both.

4. The method of claim 1, further comprising generating the trained classification algorithm according to a set of rules provided at least in part by user input.

5. The method of claim 1, further comprising modifying the trained classification algorithm based, at least in part, on the desired content, metadata, or both extracted from the content-rich pages.

6. The method of claim 1, wherein said electing comprises numerically voting, and wherein a number of votes is equivalent to a number of content-rich pages.

7. The method of claim 1, wherein said electing comprises conducting a weighted voting.

8. The method of claim 1, wherein said generating a feature vector further comprises devaluing language type as a feature relative to other features.

9. The method of claim 1, wherein the language-independent representation comprises a document object model (DOM) structure.

10. A system comprising processing circuitry and at least one form of storage media, the processing circuitry executing instructions stored on the storage media to:

parse content-rich pages to obtain a language-independent representation comprising a hierarchical structure of one or more nodes, the content-rich pages being parts of a live website, a static harvest of a website, or both provided by the storage media, communications circuitry connected with the system, or both;

generate a node representation for each node, the node representation comprising an expression stored in the storage media;

generate a feature vector for each node of the language independent representation;

assign a label to each node representation according to a schema by executing a trained classification algorithm on the feature vectors of the content-rich pages, the schema comprising one or more schema elements, each schema element corresponding to a label;

gather, for each schema element, all node representations having matching labels;

elect from among the node representations having matching labels one node representation to assign to a schema element field in a template; and apply the template to extract the desired content, metadata, or both according to the schema from all of the content-rich pages.

11. The system of claim 10, wherein the processing circuitry further executes instructions stored on the storage media to output the desired content extracted from all of the content-rich pages to the storage media, to communications circuitry, or to a display device.

12. The system of claim 10, wherein the node representation comprises an XPath expression.

13. The system of claim 10, further comprising statistics provided by a training set from the storage media, from communications circuitry connected with the system, or from both, the statistics processed by the processing circuitry to generate the trained classification algorithm.

14. The system of claim 10, further comprising a set of rules provided at least in part by user input through a user input device, the set of rules processed by the processing circuitry to generate the trained classification algorithm.

15. The system of claim 10, wherein the processing circuitry further executes instructions stored on the storage media to modify the trained classification algorithm based, at least in part, on the desired content, metadata, or both extracted from the content-rich pages.

16. The system of claim 10, wherein the instructions stored on the storage media and executed by the processing circuitry to elect, further comprises instructions to numerically vote, wherein a number of votes is equivalent to a number of content-rich pages.

17. The system of claim 10, wherein the instructions stored on the storage media and executed by the processing circuitry to elect, further comprises instructions to conduct a weighted vote.

18. The system of claim 10, wherein the instructions stored on the storage media and executed by the processing circuitry to generate a feature vector, further comprises instructions to devalue language type as a feature relative to other features.

19. The system of claim 10, wherein the language-independent representation comprises a document object model (DOM) structure.

* * * * *